May 1, 1962

A. CORBIN 3,032,270

COMPUTER

Filed Nov. 6, 1957

INVENTOR
ALFRED CORBIN

BY Donald P. Smith

ATTORNEY

3,032,270
COMPUTER

Alfred Corbin, Melbourne, Fla., assignor to ACF Industries, Incorporated, New York, N.Y., a corporation of New Jersey
Filed Nov. 6, 1957, Ser. No. 694,784
4 Claims. (Cl. 235—183)

This invention relates to a motor control circuit and more especially to a circuit wherein the control of a motor results in an indication by the motor output shaft which represents the integration of a quantity.

An object of this invention is to drive a motor at a low average speed by supplying it with pulses of energization which may be periodic or random.

Another object of the invention is to drive a motor from a source of energy impressed across a dividing circuit in accordance with the value of a variable, the angular position of the motor being a function of the integration of the variable over a period of time.

Another object of the invention is to provide a circuit wherein a high torque motor is driven from a low current capability circuit.

A further object of the invention is to provide an integrating computer for use in a simulated aircraft wherein a potentiometer has a wiper arm positioned in accordance with a derived signal and a motor is driven in a manner proportional to the integration of the signal over a period of time.

Summarily stated, the invention provides a novel motor control arrangement wherein a dynamoelectric machine having a relatively high torque characteristic may be pulsed or intermittently driven from a high impedance source through repetitive cycles of condenser charging and discharging. The invention finds its application in many fields and is of special value when applied to solve the problem of operating a low impedance motor from a high impedance supply such as a vacuum tube or low current rectifier. The invention is useful in simulators, especially aircraft simulators, for the training of pilots wherein the output motor shaft is usable to indicate the integration of a quantity in accordance with time.

Further objects and features of the invention will be apparent from the following description when taken in connection with the accompanying drawing in which.

Figure 1:
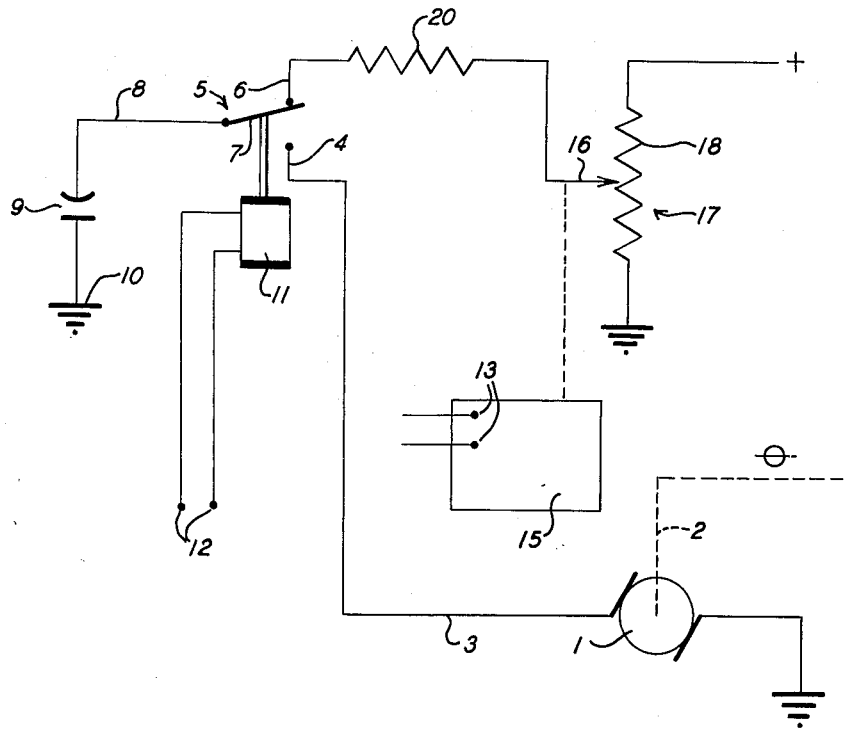
FIGURE 1 is a schematic wiring diagram of the invention.

For convenience in describing the invention and in order to facilitate an understanding thereof, reference is here made to the embodiment illustrated in the drawing. It will be appreciated that no limitation of the scope of the invention is thereby intended, and such alterations and modifications of the illustrated structure as occur to those skilled in the art are contemplated as being part of the invention.

A D.C. motor 1 having an output shaft 2 is connected to ground and through wire 3 is joined to a terminal 4 of a multi-terminal relay 5 having a terminal 6 and a movable armature 7 connected by connection 8 to one plate of condenser 9. The condenser has its other plate grounded as at 10. An electromagnetic core 11 is depended upon to actuate armature 7 in the usual way and has terminals 12 connectable to a source of energy which may be cyclically variable in amplitude as in the preferred form herein or may receive random pulses. An example of such a source of energy is a synchronous motor driven from a source of constant frequency alternating current and having a cam connected to its shaft. Any convenient source of current would be connected to terminals 12 with a circuit interrupter or switch connected in series therewith. If, then, the circuit interrupter is arranged to be actuated by the motor driven cam, periodic pulses of energy will be transmitted to coil 11 to cyclically operate the same.

A servo system 15 having a mechanical output movable in a manner representative of derived signal inputs to terminals 13 is joined to the wiper arms 16 of potentiometer 17. The potentiometer has a winding 18 connected between a source of energy and ground. A resistor 20, which is for protection and adjustment in this circuit, is connected between wiper arm 16 and terminal 6 of the relay 5. Resistor 20 is the charging resistor for condenser 9, and the quantity of the energy stored in the condenser when armature 7 engages terminal 6 is a function of the position of wiper 16, the value of resistor 20, and the capacity of the condenser 9. The position of wiper 16 is, in turn, a function of the shaft position of servo 15 which turns in accordance with the derived signals. For a description of the interrelation between the derived signal source, and the servo system and the drive motor for a typical computer, reference is made to the patent to Lovell et al., Serial No. 2,408,081 and more especially to FIGURES 10 and 11 thereof.

This invention operates as follows: Let us assume that the energy input to servo 15 is such that the shaft remains in a fixed position. The voltage then picked off by the wiper 16 is applied to condenser 9 and a charge is built up thereon depending on the time cycle of the voltage input applied to terminals 12, the value of resistor 20 and the capacity of the condenser. On application of an input control pulse to terminals 12 the electromagnetic core 11 is energized and armature 7 is pulled to the lower position wherein it engages contact 4 and disconnects the condenser from its charging source. The stored energy in condenser 9 is transferred through the contact 4 to motor 1 and the discharge produces a momentary torque sufficient to cause displacement of the output shaft. The amount of displacement depends on the charge voltage, the motor characteristics and the mechanical properties of the output shaft and gear train.

When servo 15 position changes, whereby wiper 16 is moved up and down along the length of potentiometer winding 18, the voltage input to the circuit is instantaneously variable and the charge received by the condenser is a function of the wiper position and the time between cycles of energy applied through terminal 12. When the electromagnet 11 is energized, whatever energy may be stored in the condenser 9 is transmitted to the motor 1 to move the shaft an increment depending on the average positioning of the wiper 16 during the time previous to energy application at terminals 12. The position of the shaft of motor 1 represents the integration of the series of instantaneous wiper positions and may be represented by the curve shown in FIGURE 2 wherein the function ($\theta$) is plotted against time; each discrete value being shown as a sawtooth function 22 and the average curve 23 representing integration of the variable over time T.

In a strictly power sense the above described circuit permits a motor 1 of reasonably large torque characteristics to be pulsed from a high impedance source. The condenser 9 acts to store the energy from the source over a period of time determined by the cyclic operation of electromagnet 11. and the application of such energy to motor 1 through the motion of armature 7 results in the displacement of the output shaft to give a low average speed.

The system is shown in its simplest form to run in one direction only, however the addition of another relay-capacitor-resistor circuit makes the system bi-directional with adjustment for average speed in either direction.

The invention herein described thus has dual applications. First as an integrator to perform mathematical function for use in, for example, a simulated aircraft for training pilots and as a power circuit to actuate a fairly large capacity motor from a relatively high impedance power source.

I claim:

1. An integrating computer comprising in combination a potentiometer having a winding and a wiper, a source of derived signals, means responsive to the said source of derived signals to move the said wiper to a position on the winding to represent a variable, a motor having an output shaft, a source of electrical energy connected across the said potentiometer winding, a condenser, switching means selectively connected to said wiper, said condenser, and said motor and arranged to alternately connect the condenser to the wiper and to the motor, and means connected to said switching means to actuate the same as a predetermined rate, the said motor output shaft taking a position representing the integration of the said variable with respect to time.

2. A computer for integrating a variable with respect to time comprising in combination a potentiometer having a winding and a wiper, a source of derived signals, means responsive to the said source of derived signals to move the said wiper to a position on the winding representing a variable, a motor, a source of electrical energy connected across the said potentiometer winding, a condenser, switching means selectively connected to said wiper, said condenser and said motor and arranged to alternately connect the condenser to the wiper and to the motor, and an energy source connected to said switching means nd varying as a function of time to alternately connect the said condenser to the said wiper to receive a charge and to the said motor to discharge and drive the same to a position representing the integral of the function with respect to time.

3. A motor control circuit of the type used to integrate a variable with respect to time comprising in combination a dynamoelectric machine, a potentiometer having a winding connected across a first source of electrical energy and a wiper arm movable with respect to said winding, a motor connected to a source of derived signals having a magnitude proportional to a variable and having a shaft joined to said arm to move the same to a position representative of the variable, a condenser, a relay having an armature an energizing coil and respective contact pairs connected to the said condenser the said wiper arm and the said dynamoelectric machine, and a second source of electrical energy having a characteristic cyclically variable with respect to time connected to the relay coil to periodically actuate the same and alternately connect the said condenser to the first recited source of energy to charge the same, and to the dynamoelectric machine to discharge the condenser and drive said machine to a position representing the integral of the said derived signals with respect to time.

4. A motor control circuit of the type for driving a motor at a low average rate comprising in combination a direct current motor, a capacitor, a source of energy having a high impedance relative to the impedance of the motor, electromagnetic switching means to alternately connect the said capacitor to the source of energy to receive a charge and to the motor to discharge through the motor windings and drive the same, a source of signal energy, and means connecting the said last recited source to the said switching means for actuating said switching means in response to signals from said source of signal energy.

References Cited in the file of this patent

UNITED STATES PATENTS

| | | |
|---|---|---|
| 2,473,542 | Philpott | June 21, 1949 |
| 2,551,964 | Norton | May 8, 1951 |
| 2,622,231 | Gray | Dec. 16, 1952 |
| 2,717,310 | Woodruff | Sept. 6, 1955 |
| 2,789,761 | Merrill | Apr. 23, 1957 |

OTHER REFERENCES

Figure 2:
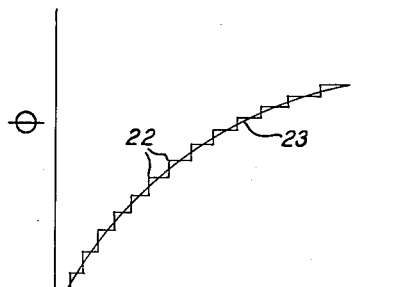
FIGURE 2 is a representation of a typical curve obtained when the circuit is used as an integrator.

Analog Methods in Computation and Simulation (Soroka), published by McGraw-Hill (New York), 1954, Fig. 2.42b on page 80 relied on.